United States Patent [19]

Cam et al.

[11] Patent Number: 5,779,773
[45] Date of Patent: Jul. 14, 1998

[54] RECEPTACLE HAVING A GRILLE THEREIN FOR SUPPORTING AN ACTIVE MATERIAL

[75] Inventors: François Cam, Drancy; Serge Phelut, Champigny sur Marne, both of France

[73] Assignee: L'Air Liquide, Societe Anonyme pour l'Etude et Exploitation des Procedes Georges Claude, Paris Cedex, France

[21] Appl. No.: 602,070

[22] Filed: Feb. 15, 1996

[30] Foreign Application Priority Data

Feb. 15, 1995 [FR] France ................... 95 01731

[51] Int. Cl.⁶ .................................................. B01D 53/04
[52] U.S. Cl. ................... 96/152; 55/418; 55/494; 55/515; 96/154
[58] Field of Search ................... 55/418, 474, 494, 55/515, 523; 95/85, 88, 268, 274; 96/105, 107, 108, 150, 152, 154, 206

[56] References Cited

U.S. PATENT DOCUMENTS

| | | | |
|---|---|---|---|
| 1,040,914 | 10/1912 | Farmer | 55/494 |
| 1,085,712 | 2/1914 | Vadner | 55/474 |
| 1,847,297 | 3/1932 | Dotter | 96/152 |
| 2,435,781 | 2/1948 | Heydorn | 55/494 |
| 3,246,453 | 4/1966 | Becker | 55/418 |
| 3,448,561 | 6/1969 | Seibert et al. | |
| 3,519,135 | 7/1970 | Lerner | |
| 3,925,041 | 12/1975 | Patterson et al. | 96/152 |
| 4,094,789 | 6/1978 | Kemper | 96/206 |
| 4,298,589 | 11/1981 | LeBlanc et al. | |
| 5,538,544 | 7/1996 | Nowobilbki et al. | 96/152 |

FOREIGN PATENT DOCUMENTS

| | | | |
|---|---|---|---|
| 658166 | 2/1963 | Canada | 96/152 |
| 0 080 125 | 6/1983 | European Pat. Off. | |
| 714674 | 12/1941 | Germany | 96/152 |
| 2 156 402 | 5/1973 | Germany | |
| 2506252 | 11/1975 | Germany | 55/494 |
| 2815082 | 10/1979 | Germany | 96/152 |
| 2181073 | 4/1987 | United Kingdom | 96/152 |

*Primary Examiner*—C. Scott Bushey
*Attorney, Agent, or Firm*—Young & Thompson

[57] ABSTRACT

A grille (26) for retaining an active material (42) in a receptacle (10) which has a convex bottom (14) delimiting an internal space within the receptacle. The grille (26) has the form of a vault and is disposed in the internal space in contact about a portion of its periphery with the internal wall of the convex bottom of the receptacle. The direction of convexity of the vault (26) and of the bottom (14) are opposite to each other. Use in grilles for the support of an adsorbent material in an adsorber.

17 Claims, 5 Drawing Sheets

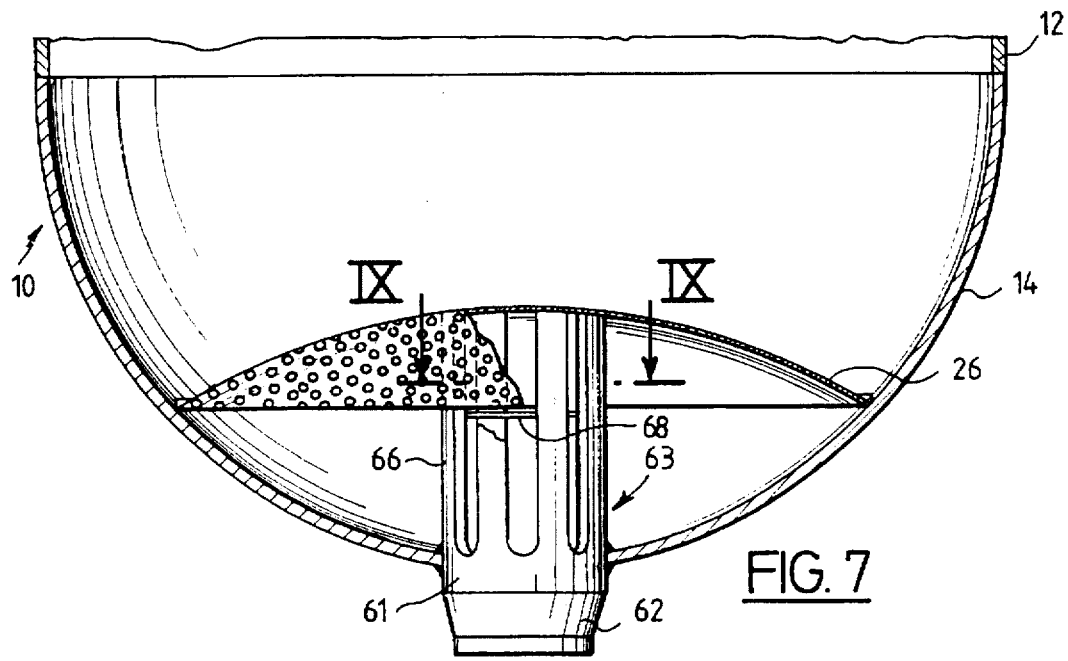
FIG. 7
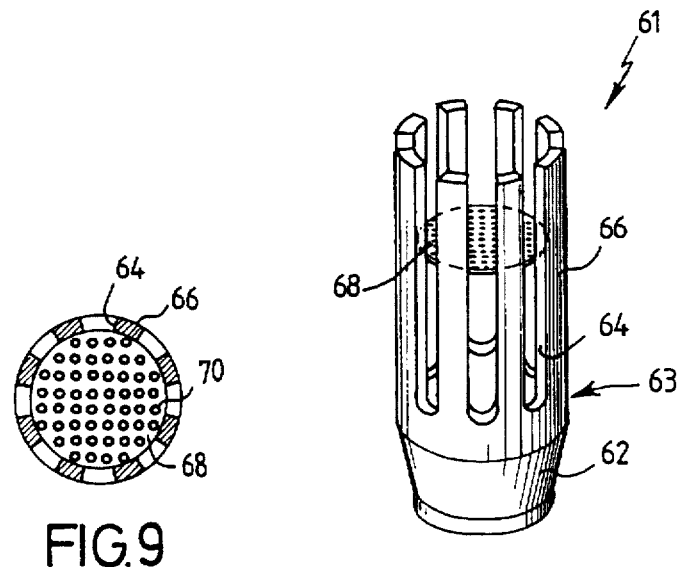
FIG. 9
FIG. 8

RECEPTACLE HAVING A GRILLE THEREIN FOR SUPPORTING AN ACTIVE MATERIAL

BACKGROUND OF THE INVENTION

The present invention relates to an arrangement of a grille for retaining an active material in a receptacle, comprising a convex portion which delimits an internal space within the receptacle, particularly a convex bottom.

In industrial installations, particularly installations for the purification by adsorption and installations for the treatment of gas or petroleum derivatives, there are frequently provided receptacles or reactors containing an active material formed for example of a catalyst or of pellets of an adsorbent material.

This active material within receptacles is maintained, retained and/or supported by grilles, particularly disposed above fluid supply or withdrawal openings.

For receptacles in which the opening, for example the supply opening, empties into a convex portion of the latter, for example a hemispherical bottom, the current technique consists in arranging above the bottom a flat grille forming a support for the active material disposed in the receptacle. By the convex portion is meant a portion with dimensions decreasing from the receptacle delimited by a bulging surface projecting outwardly.

In a conventional manner, this flat grille is formed from an assembly of grating resting on a support structure disposed in the hemispherical portion forming the bottom. This support structure is generally formed of radiating ribs welded to the internal wall of the bottom and thus constitutes a complete screen from the bottom.

The weight of the material to be supported and the large pressure drops due to circulation of the fluid in the receptacle subject the grille to high pressures. Because of this, the support structure must have a high mechanical resistance.

Moreover, so as to guarantee good distribution of the gases within the active material, the grille is disposed in the lower portion of greatest section, which is to say at the equatorial level in the case of a hemisphere. All the volume of this hemisphere is then used to permit good distribution of fluid. This volume of the receptacle constitutes a dead space with respect to the use of the receptacle because it contains no active material, which requires designing receptacles of relatively large volume.

Moreover, so as to improve further the distribution of the gas in the active materials, there can be interposed a layer of diffusing material, for example ceramic pellets, between the active material and the grille. This supplemental layer reduces further the volume available for the active material.

Thus, the grilles for the retention of active material utilized at present in receptacles have a relatively high cost of employment because they require a solid and complicated support structure which reduces further the volume available for the active material in the receptacle.

OBJECTS OF THE INVENTION

The invention has for its object to provide a grille for retaining active material arranged so as to reduce its cost of production and of utilization in a convex portion of a receptacle, and which moreover permits increasing the volume available for the active material, thereby reducing the total volume of the receptacle for equivalent performance of the latter.

To this end, the invention has for its object an arrangement of a grille for retaining an active material in a receptacle, comprising a convex portion which delimits an internal space of the receptacle, particularly a convex bottom, characterized in that the grille has the shape of a vault and is disposed in said internal space in contact about at least a portion of its periphery with the internal wall of the convex bottom of the receptacle, the directions of convexity of the vault and of the bottom being opposite to each other.

According to particular embodiments, the invention can have one or several of the following characteristics:

- the convex bottom comprises a fluid inlet or outlet opening, said grille being interposed between this opening and said active material;
- the opening is provided with a deflector disposed at least partially in the space delimited by the grille and the convex bottom, the deflector forming a support for the grille;
- the convex bottom is delimited by a surface of revolution, and the grille has the form of a spherical cap;
- the receptacle has a cylindrical shape, said convex portion being formed by a semi-cylinder defined longitudinally of the receptacle, and the grille the form of a trough;
- the grille comprises essentially a self-supporting metal sheet pierced with multiple communication openings;
- the openings are bridged holes;
- the openings are holes pierced through the sheet metal, of which certain ones are embossed;
- the projecting portions of the sheet associated with the openings are oriented toward the active material contained in the receptacle;
- the sheet metal is covered with a metallic grid on the side of the active material;
- the periphery of the grille is received in a metallic profile welded on the internal wall of the receptacle;
- the receptacle is an adsorption container whose bottom is convex, and the grille is a grille for supporting a particulate adsorbent material contained in the receptacle;
- there is provided a layer of a diffusion material, particularly ceramic pellets, disposed between the grille and the active material.

The invention also has for its object a receptacle comprising a convex portion which delimits an internal space of the receptacle, particularly a convex bottom, and containing an active material retained, on the side of this convex portion, by a grille arranged as above.

BRIEF DESCRIPTION OF THE DRAWINGS

The invention will be better understood from reading the description which follows given solely by way of example and referring to the accompanying drawings, in which.

3

Figure 5:
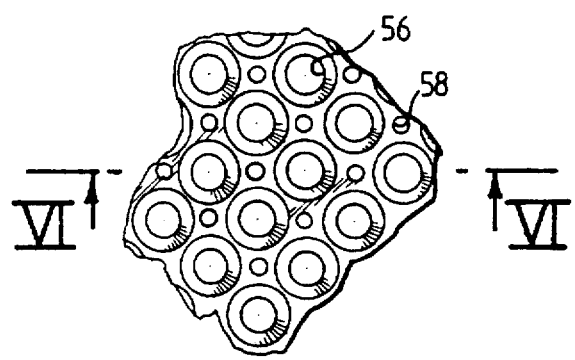
FIG. 5 is a plan view of a portion of sheet metal forming the grille according to a second embodiment of the latter.
Figure 6:
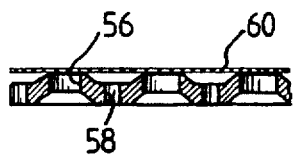
Figure 10:
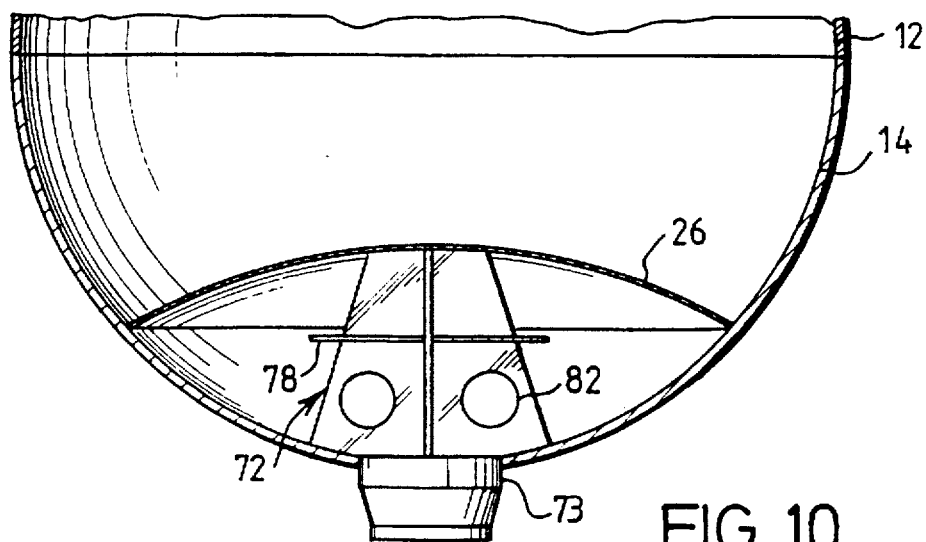
Figure 11:
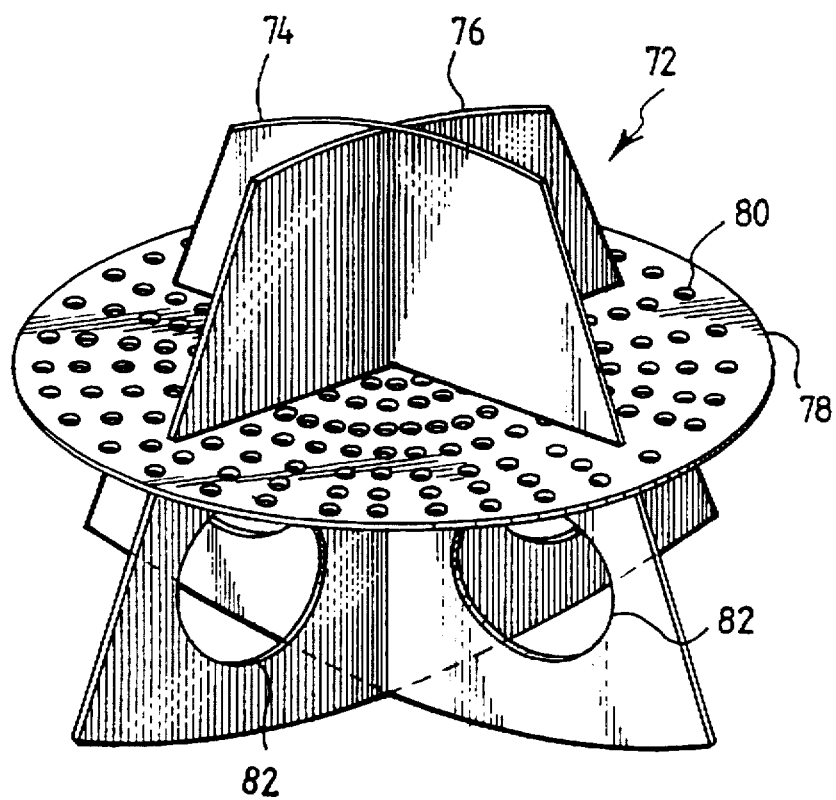
Figure 12:
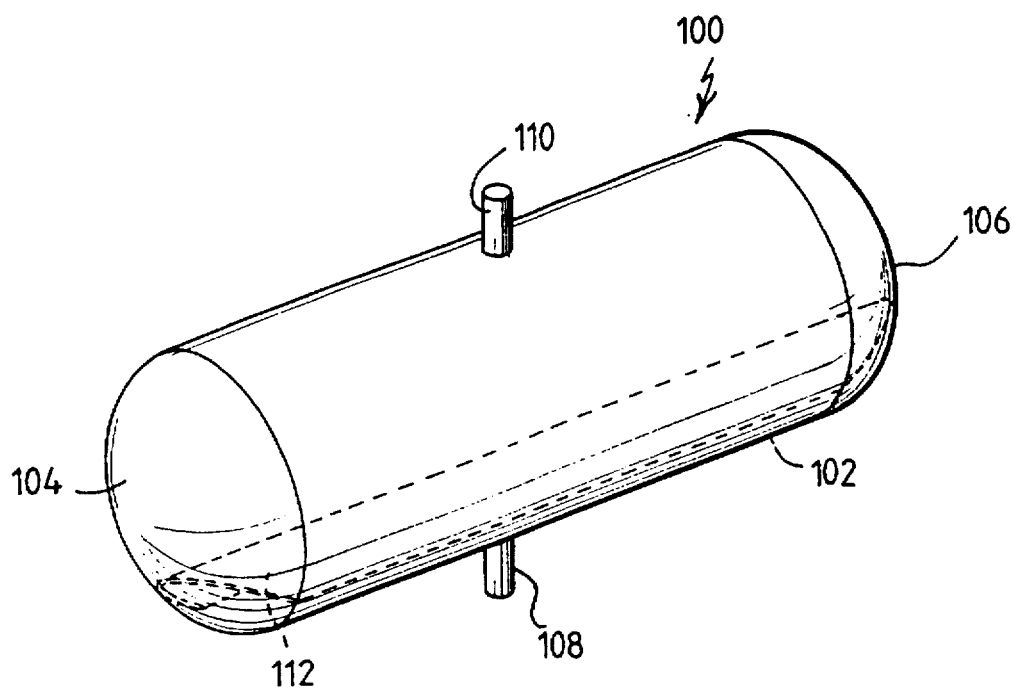
Figure 13:
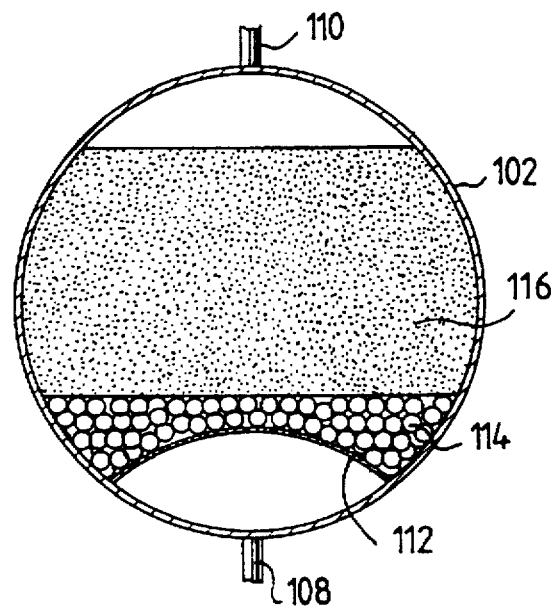

FIG. 6 is a cross-sectional view of the sheet metal of FIG. 5 on the line VI—VI;

FIG. 7 is a view partially in elevation and partially in longitudinal cross section, of a grille arranged in the bottom of an adsorber according to the invention, associated with a deflector forming a support according to a first embodiment;

FIG. 8 is a perspective view of the deflector of FIG. 7;

FIG. 9 is a cross-sectional view of the deflector of FIG. 7 taken on the line IX—IX;

FIG. 10 is a fragmentary longitudinal cross sectional view of a grille arranged in a bottom of an adsorber according to the invention, associated with a deflector forming a support according to a second embodiment;

FIG. 11 is a perspective view of the deflector of FIG. 10;

FIG. 12 is a perspective view of a cylindrical adsorber with a horizontal axis provided with a grille arranged according to the invention; and FIG. 13 is a transverse cross-sectional view of the adsorber of FIG. 12.

DETAILED DESCRIPTION OF THE PREFERRED EMBODIMENTS

Figures 1, 2, 3:
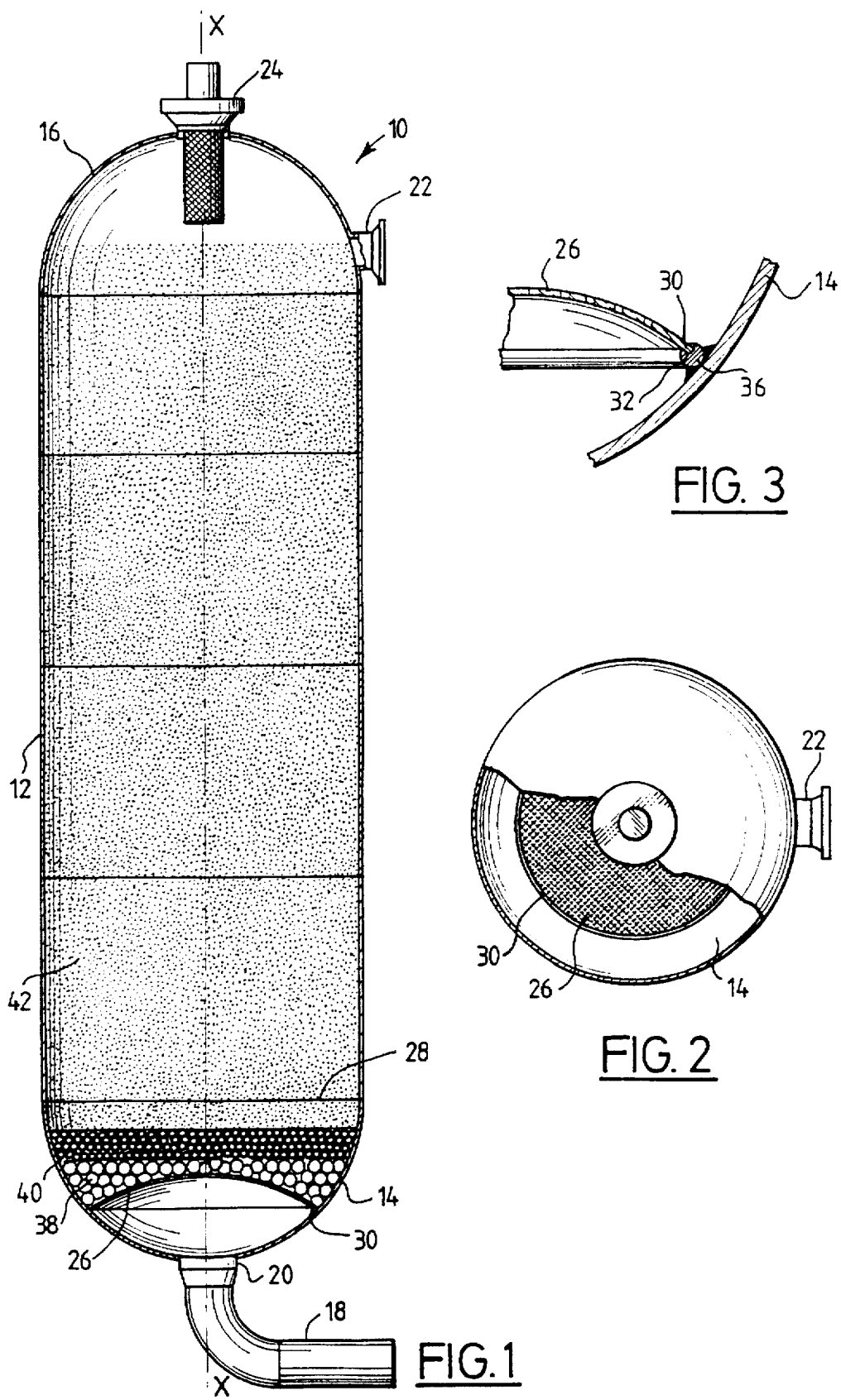
FIG. 1 is a longitudinal cross-sectional view of an adsorber provided with a retention grille arranged according to the invention.
FIG. 2 is a view from above with parts broken away, of the adsorber of FIG. 1, the adsorbent materials having been removed.
FIG. 3 is a view on a larger scale of a detail of FIG. 1 showing the connection between the grille and the bottom of the adsorber.

In FIG. 1 is shown an adsorption receptacle 10 comprising in a conventional manner a cylindrical sleeve 12 with a vertical axis X—X, formed by an assembly of superposed elemental sleeves, a convex hemispherical bottom 14 and a convex hemispherical top 16. In this example, the diameter of the sleeve is 3 m, but it can be substantially greater than this value.

The adsorber 10 comprises a supply tube 18 for the gas to be treated, connected to the hemispheric bottom 14 by an opening 20 emptying into the summit of the hemisphere along the axis X—X.

The top 16 is provided with a lateral outlet 22 for evacuation of the treated gas, as well as a safety valve 24 disposed at the summit of this latter.

A self-supporting grille 26 for support and retention of adsorbent material disposed in the adsorber 10 above the grille, is disposed within the space delimited by the bottom 14, below the equatorial section 28 of this latter forming the connection between the bottom 14 and the cylindrical sleeve 12.

As is also shown in FIG. 2, the grille 26 is formed by a spherical cap having a radius of curvature of about 2.5 m and forming a vault, whose convexity is oriented upwardly. This grille bears about its circular periphery 30, on the internal wall of the bottom. The diameter of the circular periphery 30 is equal to the radius of curvature of the spherical cap. Thus the grille 26 extends between the lower third and the halfway level of the bottom 14.

The grille 26 is formed for example by stainless steel sheet metal perforated and embossed, whilst the bottom 14 of the adsorber is formed of carbon steel sheet. Thus, so as to secure the grille 26 on the bottom, the periphery 30 of this latter is received (FIG. 3) in a groove 32 of a carbon steel ring formed with an annular shape. The ring 36 is welded in a conventional manner on the internal wall of the bottom 14, whilst the grille 26 is welded to the ring 36, if desired after thermal treatment of this latter and of the bottom 14 in assembly.

The grille can also if desired be welded directly to the bottom.

The grille 26 is entirely covered with a first layer 38 of ceramic pellets of large diameter forming a gas diffuser, on

4 the flat surface of which rests a second layer 40 of ceramic pellets of smaller diameter, of uniform thickness, also provided for the diffusion of the gas. These two layers are received within the hemispherical bottom 14, below the equatorial line 28. Above these two layers, the upper portion of the bottom 14 as well as the cylindrical sleeve 12 are filled with an adsorbent material 42 of suitable particles. The filling is effected to the level of the outlet 22 for evacuation of the gases.

Figure 4:
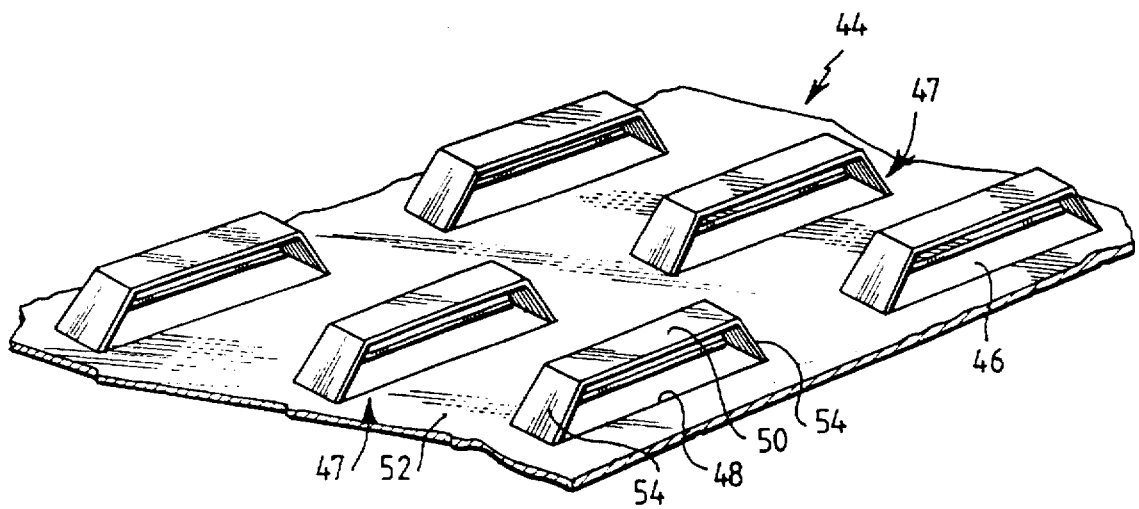
FIG. 4 is a perspective view of a portion of sheet metal forming the grille according to a first embodiment.

In FIG. 4, there is shown an example of sheet metal 44 adapted to form the grille 26, according to a first embodiment. This sheet metal is provided with openings 46 formed by bridged holes 47 of rectangular shape.

These bridged holes comprise an opening 48 of rectangular shape above which extends a rectangular tongue 50 connected to the principal surface 52 of the sheet metal by two opposite legs 54. The tongue 50 and the legs 54 thus form a bridge above the opening 48.

Such bridged holes 47 are formed from a sheet of metal in which are provided for each bridged hole two parallel slits. The portion comprised between these two slits is then pushed out by an embossing tool beyond the principal surface 52 of the sheet metal, to form a bridge constituted by the tongue 50 and the two legs 54, displaced above the opening 48 thus formed.

In a preferred embodiment, the holes are arranged along lines, the holes of two adjacent lines being offset relative to each other.

According to a second embodiment, the grille 26 can comprise embossed holes as represented in FIGS. 5 and 6.

The openings of the sheet metal are then formed from a matrix of piercings comprising circular holes 56 of large diameter alternating with smaller diameter holes 58. These holes can be obtained by punching.

The larger diameter holes 56 are pushed out by embossing their periphery with a tool having a suitable shape of revolution. Thus, as is shown in FIG. 6, the larger diameter holes are located in a plane offset relative to the principal plane of the sheet metal comprising the smaller diameter holes 58.

The openings provided in the grille 26 are preferably formed after imparting the vault shape to this latter by embossing.

In a preferred manner, the grille 26, no matter what the nature of the openings with which it is provided, is covered on its face directed toward the adsorbent material with a metallic grid 60 shown in FIG. 6. This metallic grid 60 has a fine mesh, the diameter of the mesh being less than the diameter of a ceramic pellet of the first layer 38. The grid 60 is maintained on the grille 26 by riveting.

The sheet metal provided with bridged holes (FIG. 4) or with embossed holes (FIGS. 5 and 6) is oriented such that the projecting portions of this latter associated with the openings, namely the bridges or the embossed holes, are directed toward the adsorbent material 42 so as to form microdeflector. Note also the very small contact area between the grille and the elements that it supports, which avoids practically any dead space above the grille.

In FIG. 7 there is shown a particular arrangement of the grille 26 within the bottom 14 of the adsorber 10, in which only a portion of the sleeve 12 has been shown.

A deflector 61 shown in detail in FIGS. 8 and 9 is welded to the axis of the hemisphere forming the bottom 14 and projects on opposite sides of this latter, thereby constituting outside the receptacle an opening 62 adapted to receive for example a flange (not shown) or to constitute a portion of the welding of a complementary pipe as is shown in FIG. 1.

The deflector 61 is comprised by a tubular section 63 whose one end, adapted to receive the flange, has a progressively outwardly decreasing cross section. On the side wall are provided slots 64 for dispersion of the fluid. These slots are disposed parallel to each other along generatrices of the tubular section. They are spaced at regular intervals about all the circumference of the wall of the deflector and are, in this example, eight in number.

The slots 64 define between them on the lateral wall of the tube posts 65 for supporting the central portion of the grille 26.

A diffuser 68 provided with a pattern of holes 70 and forming a grille is disposed transversely within the tube 63. The diffuser 68 is welded to the internal walls of the posts 66, approximately halfway along the height of these latter.

As is shown in FIG. 7, the deflector 61 is welded to the bottom 14, just below the slots 64, such that the grille 26 rests on the upper end of the support posts 66.

This support of annular shape is particularly adapted to coact with the surface of the grille having the shape of a spherical cap.

In FIGS. 10 and 11 is shown another embodiment of a deflector adapted to support the grille 26.

The deflector 72, shown in more detail in FIG. 11 and disposed in line with a tubular opening 73, comprises two substantially trapezoidal metal sheets 74 and 76 forming two panels which cross orthogonally and are connected together at a common height, thereby delimiting the space into four equiangular sectors. The small and large bases of the trapezoidal panels 74 and 76 are slightly curved outwardly and have profiles analogous to those of the internal wall of the bottom 14 and of the grille 26 respectively.

A diffuser disk 78 is disposed orthogonally to the panels 74 and 76, approximately at midheight of the latter. It comprises openings 80 regularly distributed over all its surface and has a diameter greater than the width of the panels 74 and 76 measured at the height of securement of the disk. Circular openings 82 are provided in each of the panels 74 and 76, below the diffuser disk 78, which is to say in the widest portion of this latter.

As is shown in FIG. 10, the deflector 72 is disposed between the bottom 14 and the grille 26. Thus, the large bases of the panels 74 and 76 rest and are welded on the bottom 14 overlapping the opening 73, whilst the small bases of these panels form bearing lines for the central portion of the grille 26. The grille 26 is welded to the panels 74 and 76 along all the length of their small bases. In these circumstances, the diffuser disk 78 extends transversely to the direction of circulation of fluid from the opening 73.

In FIG. 12 is shown another embodiment of a grille for retaining an active material arranged according to the invention.

There will be seen in this figure an adsorber 100, comprising a cylindrical envelope 102 formed from a tubular section whose axis is disposed horizontally and whose two ends are closed by bulging lateral walls 104 and 106. In the lower portion of the adsorber, constituting a bottom of convex shape formed by the lower half cylinder, opens a tubing 108 forming a supply opening for gas to be treated. In the upper portion opens an outlet tubing 110 diametrically opposed to the tubing 108.

A retaining grille 112 in the form of a vault, also shown in FIG. 13 and having the general shape of a channel or inverted gutter whose U-shaped cross section is the arc of a circle, is disposed above the tubing 108 in the bottom of the receptacle, along all the length of the latter. It has its generatrices parallel to those of the cylinder forming the receptacle and its convexity oriented upwardly. It is connected in a sealed manner about all its periphery to the envelope 102 and to the bulged side walls 104 and 106.

The grille 112 can comprise according to various embodiments, openings such as those described in connection with FIGS. 4 and 5.

As in the preceding embodiment, the grille 112 of vault shape is covered with a metallic grid (not shown). Above this grid, within the receptacle, are disposed successively (FIG. 13) at least one first layer 114 of ceramic pellets, and a second layer 116 of adsorbent material.

It will be noted that the use of a support grille for the adsorbent having the shape of a vault and oriented such that the direction of its convexity will be opposite to that of the bottom on which it rests, permits a large saving of space in the receptacle. Thus, whilst the known flat grilles must be disposed in the equatorial plane of the bottom in the case of a receptacle with a vertical axis and a hemispherical bottom, or at the level of the largest section in the case of a horizontal cylindrical adsorber, a grille of vault shape disposed as described above permits providing a large space within the bottom proper above the grille. This space is adapted to receive for example, as is shown in FIG. 1, the diffusing material as well as a certain thickness of adsorbent material. Thus, the supported materials are received in the bottom properly called of the adsorber whilst they are in known adsorbers disposed in the sleeve 12. As a result of this, the adsorbers, for a given total quantity of adsorbent material, can be of an overall reduced volume, this reduction of volume corresponding to the space saved in the bottom by the use of a grille arranged according to the invention.

This space saving is moreover rendered possible by the vault shape of the grille, which permits a better diffusion of the gas over all the width of the receptacle. Under these circumstances, it is possible to position this grille particularly low within said receptacle.

Moreover, the bulged shape of the grille permits an optimum reduction of the volume of the ceramic pellets to be used to obtain a good diffusion of the gas. Thus, these pellets are principally useful about the periphery of the support grilles, which is to say in a position eccentric relative to the outlet of the supply tube. The particular vault shape of the grille permits a reduction of the quantity of the ceramic pellets in the central portion, where they are less useful, whilst the quantity of pellets present on the periphery of the grille is maintained large.

The reduction of the dimensions of the grille and its self-supporting character permit moreover a decrease or elimination of the support structures for this latter, thereby giving an important reduction of the cost of manufacture.

The invention as has been described can of course be applied to bottoms whose shape is different, for example having an elliptical or parabolic section, or even any bottom delimited by any surface of revolution. Moreover, it is applicable to any convex portion of a receptacle other than its bottom, the top for example.

Still further, such an arrangement can be used to cover not only the inlet or outlet of the fluid, as described above, but also for a temperature or pressure detector, etc., for a manhole or other particular point on the receptacle.

Moreover, it will be noted that the use of a deflector arranged as described with reference to FIGS. 7 to 11, and whose design ensures both good distribution of the gas at the outlet of the supply tube and the support of the grille for retaining the active material, leads to reduced cost of manufacture because it permits omitting use of specific support structure for the grille.

Still further, the use of such a deflector ensuring the support of the grille permits a reduction of the thickness of this latter and thus a corresponding reduction in the cost of production. Such a deflector also permits the use of a grille of larger size.

We claim:

1. Receptacle for the treatment of fluid comprising a sleeve having a bottom portion and an internal wall and enclosing at least one active material supported on a grille having an array of perforations coextensive with its surface, said grill bearing about its periphery on the internal wall and centrally of the bottom portion via at least one vertically extending support forming a deflector having at least one passageway at its top for the circulation of fluid.

2. Receptacle according to claim 1, wherein the deflector support is disposed directly above an inlet/outlet opening for fluid into/from the sleeve.

3. Receptacle according to claim 1, wherein the bottom portion of the sleeve is convex.

4. Receptacle according to claim 3, wherein the grille is convex, the directions of convexity of the grille and the bottom portion being opposite each other.

5. Receptacle according to claim 1, wherein the bottom portion has a substantially hemispherical shape.

6. Receptacle according to claim 5, wherein the grille has a diameter less than the diameter of the receptacle.

7. Receptacle for fluid treatment comprising a sleeve having a bottom portion and an internal wall and enclosing at least one active material supported on a grille within the sleeve via an underlying diffusion layer covering the grille, the receptacle having an elongated shape, the bottom portion being convex and having substantially a semi-cylindrical form, the grill having an array of perforations coextensive with its surface, and bearing at least along its periphery on the internal wall of the bottom portion.

8. Receptacle according to claim 7, in which the grille is convex, the direction of convexity of the grille and of the bottom being opposite to each other.

9. Receptacle according to claim 4, and at least one layer of diffusion material disposed on the convex grille and having a substantially flat upper surface that supports the active material.

10. Receptacle according to claim 7, wherein the layer of diffusion material disposed on the convex grille has a substantially flat upper surface.

11. Receptacle according to claim 1, wherein the active material comprises particles of an adsorbent.

12. Receptacle according to claim 7, wherein the receptacle contains active material in the form of particles of an adsorbent.

13. Receptacle for fluid treatment, comprising a sleeve having an internal wall, a bottom portion and enclosing at least one active material disposed within the internal volume of the receptacle, a grille at the bottom of the sleeve having an array of perforations coextensive with its surface, and bearing on its periphery about the internal wall of the sleeve and supporting an active material, the grille being convex with an upwardly directed convexity and having at least a lower layer of particular diffusion material disposed on and covering the convex grille and, said particular diffusion material having a substantially flat upper surface for supporting the active material.

14. Receptacle according to claim 13, wherein the active material comprises particles of at least one adsorbent.

15. Receptacle according to claim 13, in which the diffusion material comprises ceramic pellets.

16. Receptacle according to claim 13, comprising a single layer of diffusion material.

17. Receptacle according to claim 1, wherein the support has radially extending wall members.

* * * * *